United States Patent
Jain et al.

(10) Patent No.: US 12,555,569 B2
(45) Date of Patent: Feb. 17, 2026

(54) SYSTEM TO PROVIDE NATURAL UTTERANCE BY A VOICE ASSISTANT AND METHOD THEREOF

(71) Applicant: SAMSUNG ELECTRONICS CO., LTD., Suwon-si (KR)

(72) Inventors: Nitin Jain, Uttar Pradesh (IN); Ashutosh Gupta, Uttar Pradesh (IN); Shreya Yadav, Uttar Pradesh (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 210 days.

(21) Appl. No.: 18/230,921

(22) Filed: Aug. 7, 2023

(65) Prior Publication Data

US 2024/0029717 A1    Jan. 25, 2024

Related U.S. Application Data

(63) Continuation of application No. PCT/KR2023/009109, filed on Jun. 29, 2023.

(30) Foreign Application Priority Data

Jul. 25, 2022    (IN) .............................. 202241042499

(51) Int. Cl.
G10L 15/08    (2006.01)
(52) U.S. Cl.
CPC ........ *G10L 15/08* (2013.01); *G10L 2015/088* (2013.01)
(58) Field of Classification Search
USPC ........ 704/200, 231, 246, 247, 251, 252, 275
See application file for complete search history.

(56) References Cited

U.S. PATENT DOCUMENTS 8,731,942 B2    5/2014    Cheyer et al.
9,368,114 B2 *  6/2016    Larson .................... G06F 3/165
(Continued)

FOREIGN PATENT DOCUMENTS

CN    111124348 A    5/2020
EP    3 832 644 A1    6/2021
(Continued)

OTHER PUBLICATIONS

Cha, N., et al., "Hello There! Is Now a Good Time to Talk ?: Opportune Moments for Proactive Interactions with Smart Speakers", Proc. ACM Interact. Mob. Wearable Ubiquitous Technol., vol. 4, No. 3, Article 74,(Sep. 4, 2020), 28 pages. https://doi.org/10.1145/3411810.

(Continued)

*Primary Examiner* — Leonard Saint-Cyr
(74) *Attorney, Agent, or Firm* — Sughrue Mion, PLLC

(57) ABSTRACT

Provided is a system to provide natural utterance by a voice assistant and method thereof, wherein the system comprises an automatic speech recognition module for converting one or more unsegmented voice inputs into textual format in real-time. Further, a natural language understanding module extracts the information and intent of the user from the converted textual inputs, wherein the natural language understanding module comprises a communication classification unit for classifying the user inputs into one or more pre-defined classes. Further, the system comprises a processing module for analyzing and processing the inputs from the natural language understanding module and activity identification module, wherein the processing module provides real-time intuitive mingling responses based on the responses, contextual pauses and ongoing activity of the user.

18 Claims, 12 Drawing Sheets

(56) References Cited

U.S. PATENT DOCUMENTS

| | | |
|---|---|---|
| 9,576,574 B2 | 2/2017 | Van |
| 10,468,032 B2 | 11/2019 | Huang et al. |
| 11,048,293 B2 | 6/2021 | Shin et al. |
| 11,386,268 B2 | 7/2022 | Robichaud et al. |
| 11,914,923 B1* | 2/2024 | Fotedar ................ G06F 3/0481 |
| 2004/0122673 A1 | 6/2004 | Park et al. |
| 2014/0074483 A1 | 3/2014 | Van Os |
| 2014/0172953 A1 | 6/2014 | Blanksteen |
| 2016/0154792 A1 | 6/2016 | Sarikaya et al. |
| 2017/0256257 A1 | 9/2017 | Froelich |
| 2018/0090137 A1 | 3/2018 | Horling et al. |
| 2018/0233139 A1* | 8/2018 | Finkelstein ............ G10L 17/08 |
| 2019/0095050 A1 | 3/2019 | Gruber et al. |
| 2019/0267001 A1 | 8/2019 | Byun et al. |
| 2020/0328990 A1 | 10/2020 | Kochura |
| 2020/0394366 A1 | 12/2020 | Miller et al. |
| 2021/0065693 A1 | 3/2021 | Sharifi et al. |
| 2021/0342168 A1* | 11/2021 | Lewis .................... G06F 9/453 |
| 2021/0343288 A1* | 11/2021 | Zhou ...................... G10L 15/04 |
| 2022/0129556 A1* | 4/2022 | Chen ...................... G06F 21/74 |
| 2022/0188361 A1* | 6/2022 | Botros .................. G02B 27/01 |

FOREIGN PATENT DOCUMENTS

| | | |
|---|---|---|
| WO | 2010/091013 A1 | 8/2010 |
| WO | 2023/022743 A1 | 2/2023 |

OTHER PUBLICATIONS

Ho, J., et al. "Using Context-Aware Computing to Reduce the Perceived Burden of Interruptions from Mobile Devices" (Apr. 2, 2005), CHI, ACM 1-58113-998-5/05/0004, 10 pages.

International Search Report (PCT/ISA/210) and Written Opinion (PCT/ISA/237) issued by the International Searching Authority on Oct. 18, 2023 in corresponding International Application No. PCT/KR2023/009109.

Partial Supplementary European Search Report dated Jun. 16, 2025, issued by the European Patent Office in European Application No. 23846837.5.

Communication dated Jun. 18, 2025, issued by Intellectual Property India in Indian Application No. 202241042499.

Pieraccini, "AI Assistants", The MIT Press Essential Knowledge Series, 2021 (290 pages total).

Communication dated Sep. 19, 2025, issued by the European Patent Office for European Patent Application No. 23846837.5.

* cited by examiner

SYSTEM TO PROVIDE NATURAL UTTERANCE BY A VOICE ASSISTANT AND METHOD THEREOF

CROSS-REFERENCE TO RELATED APPLICATIONS

This application is a bypass continuation of International Application No. PCT/KR2023/009109, filed on Jun. 29, 2023, which is based on and claims priority to Indian Patent Application No. 202241042499, filed Jul. 25, 2022, in the Indian Intellectual Property Office, the disclosures of which are incorporated by reference herein in their entireties.

BACKGROUND

1. Field

Provided is a system to provide natural utterance by a voice assistant and method thereof. The disclosure particularly relates to a system and method for facilitating a natural conversation between a user and voice assistant, wherein the voice assistant recognizes user interruptions and provides one or more real-time intuitive mingling responses based on the responses, contextual pauses and ongoing activity of the user.

2. Description of Related Art

The usage of voice assistants in our day to day lives has seen an exponential growth over the past few years, wherein we depend on inputs from the voice assistant for various activities such as time, weather, recipes during cooking, distance to a particular destination of interest and so on. Though the usage of voice assistants has proved to be helpful for our day-to-day chores, the existing voice assistants often provide robotic and unnatural responses during a real-time conversation with a user. In some situations, the user is unable to provide immediate responses to the voice assistant due to factors such as motion-based events (running, climbing a flight of stairs, driving), prolonged instruction-based activities (cooking, exercise), user's natural state (coughing, sneezing, yawing) and so on.

In such situations, the voice assistant loses context of the ongoing conversation due to which the user is forced to re-initiate the conversation with the voice assistant thereby causing inconvenience to the user. Further, the lack of intelligence of the existing voice assistants to provide contextual responses even during the occurrence of disturbances or interruptions hinders the user from establishing a continuous and natural conversation with the voice assistant.

The above-mentioned drawbacks are explained with the following example. Consider a user requesting a voice assistant to play a song, wherein the user utters, "Can you play the song . . . " and coughs prior to completing the request. The voice assistant responds with a list of top 5 songs rather than wait for the user to complete the request after coughing. This example indicates that the voice assistant is incapable of identifying the real-time context and acknowledge the user interruptions.

In another example, the user requests a voice assistant to calculate the distance between his current location and his office. However, as the user makes the request while running, the response of the voice assistant is not heard by the user. In this situation, the voice assistant is not intelligent enough to wait for the user to stop running before responding to his question as a result of which the user repeats his question multiple times.

Hence, there exists a need for a voice assistant for facilitating a continuous and natural conversation with a user despite of user interruptions and other disturbances.

SUMMARY

According to an aspect of the disclosure, a method comprises the steps of converting unsegmented voice inputs received from a user into textual format by an automatic speech recognition module, wherein the information and intent of the user are extracted from the converted textual inputs by a natural language understanding module. Further, the extracted data from the user inputs are classified into one or more pre-defined classes by a communication classification unit, wherein an instruction is a pre-defined class of the communication classification unit which refers to a prolonged communication between the user and voice assistant and comprises a set of contextual responses. Similarly, a request and a command are pre-defined classes of the communication classification unit which refer to a momentary communication containing prompt responses from the voice assistant.

Upon classification of user inputs, the contextual natural utter intervals are calculated during real-time conversations between the user and voice assistant by a natural utter analyzer unit. Furthermore, responses to the static and dynamic inputs provided by the user are prioritized and sequenced by a contextual sequencer unit, wherein the contextual responses are fetched from a virtual server. Resultantly, one or more real-time intuitive mingling responses are provided based on the responses, contextual pauses and ongoing activity by the intelligent activity engine.

Further, the present disclosure discloses a system to provide natural utter by a voice assistant, wherein the system comprises an automatic speech recognition module for converting one or more unsegmented voice inputs provided by a user following the utterance of a wake word, into textual format in real-time. Further, a natural language understanding module in the system extracts the information and intent of the user from the converted textual inputs, wherein the natural language understanding module comprises a communication classification unit for classifying the user inputs into one or more pre-defined classes. Further, the system comprises a the processing module for analyzing and processing the inputs from the natural language understanding module and activity identification module.

Thus, the present disclosure provides a system and method for making the existing voice assistants more intelligent and capable of conversing with a user continuously and naturally therefore overcoming the robotic and monotonous responses provided by the existing voice assistants. The processing module provided in the system calculates contextual pauses and provides one or more real-time intuitive mingling responses based on the responses, contextual pauses and ongoing activity of the user.

BRIEF DESCRIPTION OF THE DRAWINGS

The foregoing and other features of certain embodiments of the present disclosure will become more apparent from the following detailed description when read in conjunction with the accompanying drawings, in which like reference numerals refer to like elements, and.

DETAILED DESCRIPTION

Reference will now be made in detail to the description of the present subject matter, one or more examples of which are shown in figures. Each example is provided to explain the subject matter and is not limiting. Various changes and modifications obvious to one skilled in the art to which the disclosure pertains are deemed to be within the spirit, scope and contemplation of the disclosure.

Figure 1:
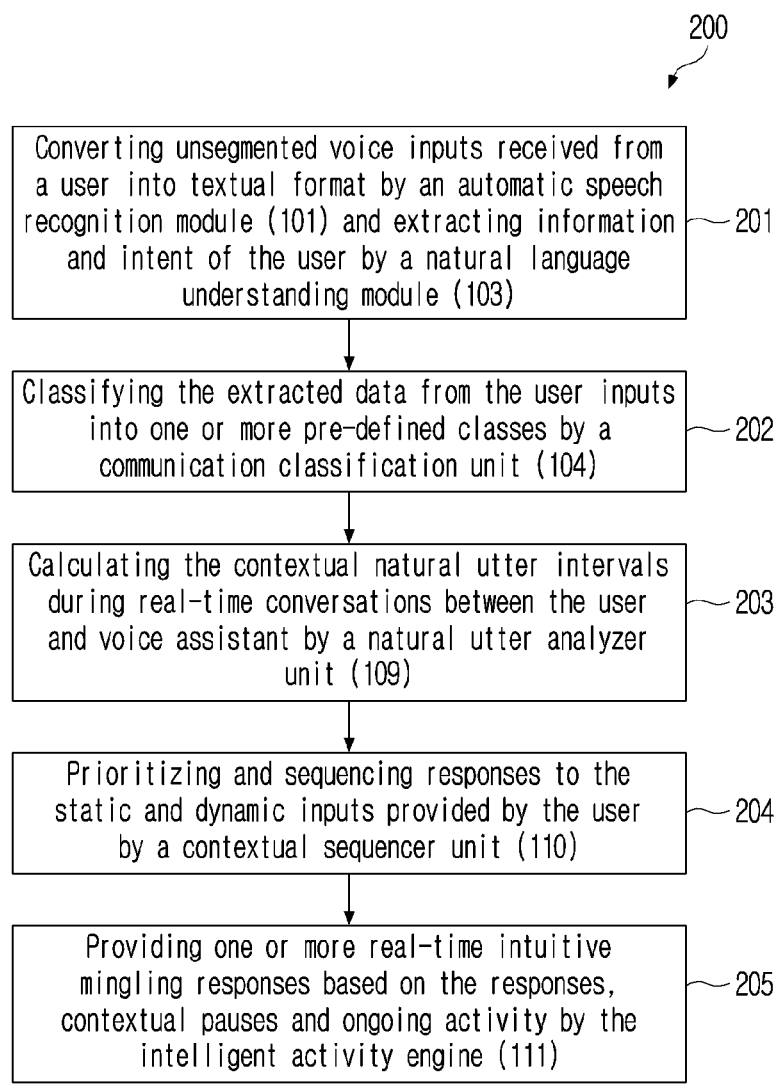
FIG. 1 illustrates a method to provide natural utterance by a voice assistant.

FIG. 1 illustrates a method to provide natural utterance by a voice assistant, wherein the method 200 comprises begins with converting unsegmented voice inputs received from a user into textual format by an automatic speech recognition module 101 in operation 201, wherein one or more queries from a user is received in the form of unsegmented voice inputs following the utterance of a wake word which is detected by a wake word engine 102. The information and intent of the user are extracted from the converted textual inputs by a natural language understanding module 103.

In operation 202, the extracted data pertaining to the information and intent of the user obtained from the user inputs are classified into one or more pre-defined classes by a communication classification unit 104. In one embodiment, a request and a command are pre-defined classes of the communication classification unit 104 which refer to a momentary communication containing prompt responses from the voice assistant. Further, an instruction is a pre-defined class of the communication classification unit 104 which refers to a prolonged communication between the user and voice assistant and comprises a set of contextual responses.

Further, subsequent to the classification of user data by the communication classification unit 104, the user's activity is tracked, and the user's environment is identified in real-time, by an activity identification module 105. Subsequently, in operation 203, the contextual natural utterance intervals are calculated during real-time conversations between the user and voice assistant by a natural utterance analyzer unit 109. Further, in operation 204, responses to the static and dynamic inputs provided by the user are prioritized and sequenced by a contextual sequencer unit 110, wherein the contextual responses are fetched from a virtual server 108.

Upon prioritizing and sequencing responses to the static and dynamic inputs provided by the user, the user's active listening state is identified, and the subsequent tasks are performed based on the identified listening state of the user and the contextual natural utterance intervals, by an intelligent activity engine 111. In operation 205, subsequent to the identification of the user's active listening state and contextual natural utterance intervals, one or more real-time intuitive mingling responses are provided by the method 200. Further, artificial intelligence and deep neural networks are used for learning user behavior and identifying effectiveness of natural utterance.

Figure 2:
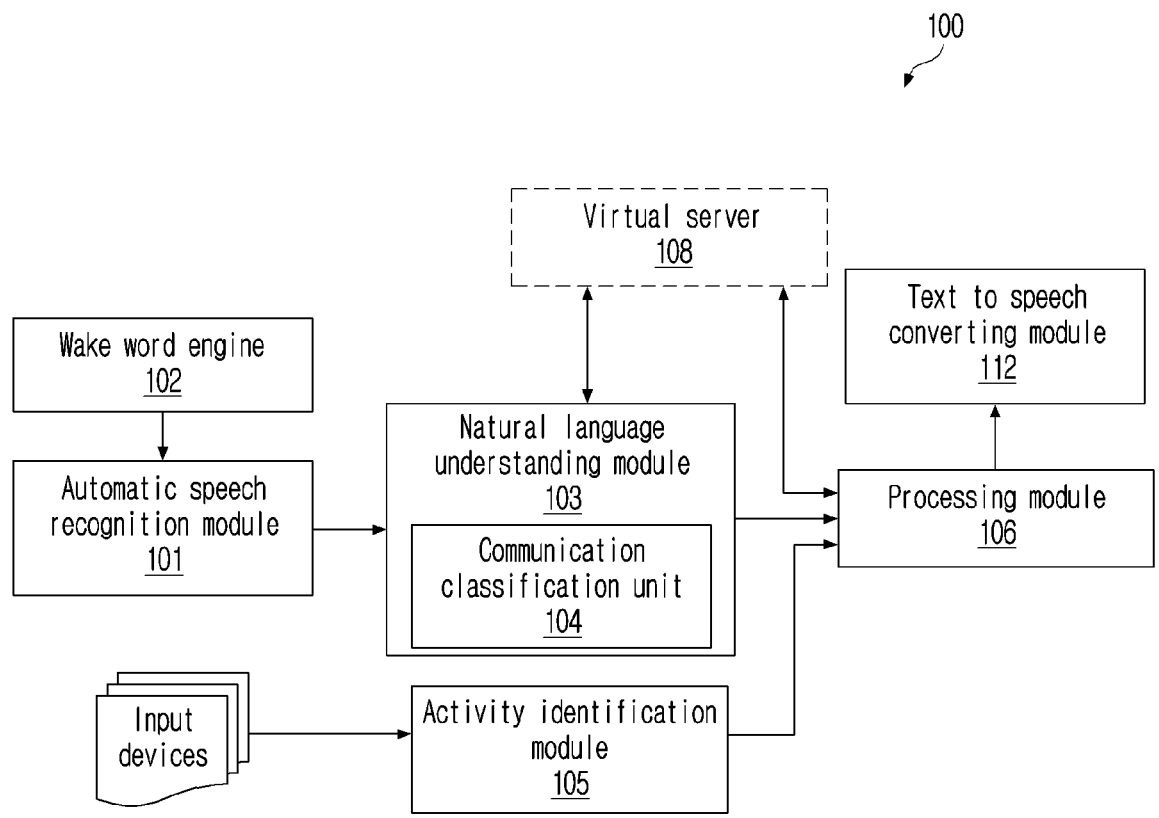
FIG. 2 illustrates a system to provide natural utterance by a voice assistant.

FIG. 2 illustrates a system to provide natural utterance by a voice assistant, wherein the system 100 comprises an automatic speech recognition module 101 (e.g., automatic speech recognition code executed by a processor or specialized circuitry designed to implement an automatic speech recognizer) for converting one or more unsegmented voice inputs provided by a user following the utterance of a wake word, into textual format in real-time, wherein one or more queries from a user is received in the form of unsegmented voice inputs following the utterance of a wake word which is detected by a wake word engine 102 (e.g., wake word detection code executed by a processor and configured to detect wake words in sounds received by a microphone or specialized circuitry designed to implement a wake word analyzer). Further, the system 100 comprises a natural language understanding module 103 (e.g., natural language understanding code executed by a processor or specialized circuitry designed to implement a natural language understanding system) for extracting the information and intent of the user from the converted textual inputs, wherein the natural language understanding module 103 comprises a communication classification unit 104 (e.g., communication classification code executed by a processor or specialized circuitry designed to implement a communication classifier) for classifying the user inputs into one or more pre-defined classes such as a request, command, instruction and so on.

Further, the system 100 comprises a processing module 106 (e.g., processing code executed by a processor or specialized circuitry) for analyzing and processing the inputs from the natural language understanding module 103 and activity identification module 105 (e.g., activity identification code executed by a processor or specialized circuitry designed to implement an activity identifier), wherein the processing module 106 comprises a response engine 107 (e.g., response code executed by a processor or specialized circuitry designed to implement a response engine) for fetching contextual responses to the questions and requests provided by the user based on user intent and entity, from a virtual server 108. Additionally, the processing module 106 comprises a natural utterance analyzer unit 109 (e.g., natural utterance analyzer code executed by a processor or specialized circuitry designed to implement a natural utterance analysis system), a contextual sequencer unit 110 (e.g., contextual sequencing code executed by a processor or specialized circuitry designed to implement a contextual sequencer) and an intelligent activity engine 111 (e.g., intelligent activity code executed by a processor or specialized circuitry designed to implement an intelligent activity system), wherein the natural utterance analyzer unit 109 calculates the contextual natural utterance intervals during real-time conversations between the user and voice assistant. Further, the contextual sequencer unit 110 prioritizes and sequences the responses to the static and dynamic inputs provided by the user, wherein the contextual responses are fetched from the virtual server 108. Furthermore, the intelligent activity engine 111 identifies the user's active listening state and performs the subsequent tasks based on the identified listening state of the user. Resultantly, the contextual text-based responses determined by the processing module 106 are converted into speech format by a text to speech converting module 112 (e.g., text to speech conversion code executed by a processor or specialized circuitry designed to implement a text to speech converter).

Figure 3:
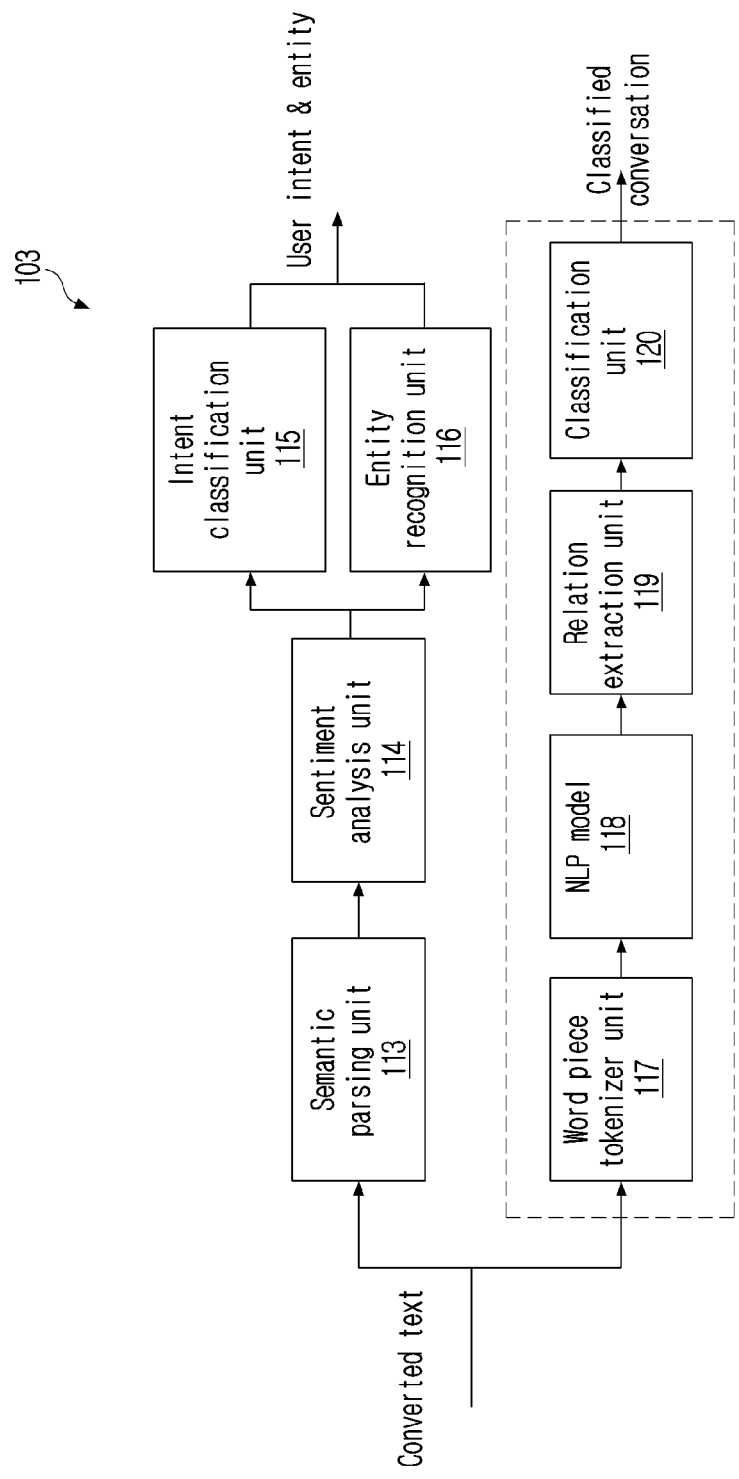
FIG. 3 illustrates a block diagram representation of the natural language understanding module with the communication classification unit.

FIG. 3 illustrates a block diagram representation of the natural language understanding module with the communication classification unit, wherein the natural language understanding module 103 comprising the communication classification unit 104 further comprises a semantic parsing unit 113 (e.g., semantic parsing code executed by a processor or specialized circuitry designed to implement a semantic parser) for converting the natural language present in textual format, into a machine-readable logical format required for further analysis and processing. Further, the output of the semantic parsing unit 113 is provided to a sentiment analysis unit 114 (e.g., sentiment analysis code executed by a processor or specialized circuitry designed to implement a sentiment analyzer) for accepting the parsed data from the semantic parsing unit 113 and detecting the positive, negative and neutral sentiments present in the inputs provided by the user. Further, an intent classification unit 115 (e.g., intent classification code executed by a processor or specialized circuitry designed to implement an intent classifier) and an entity recognition unit 116 (e.g., entity recognition code executed by a processor or specialized circuitry designed to implement an entity recognizer) are provided, wherein the intent classification unit 115 classifies the user intent based on the sentiments detected by the sentiment analysis unit 114 and the entity recognition unit 116 determines one or more subjects present in the inputs provided by the user.

Further, the communication classification unit 104 in the natural language understanding module 103, comprises a word piece tokenizer unit 117 (e.g., word piece tokenization code executed by a processor or a specialized circuit designed to implement a word piece tokenizer) for splitting the user input into one or more tokens, wherein each token represents a word from the inputs provided by the user. Further, the communication classification unit 104 includes a Natural Language Processing NLP model 118 (e.g., NLP model code executed by a processor or a specialized circuit designed to implement an NLP model) for classifying the tokens into one or more pre-defined classes. In one embodiment, the Natural Language Processing NLP model 118 may be, but is not limited to, a Bidirectional Encoder Representations from Transformers BERT variant. Further, the communication classification unit 104 includes a relation extraction unit 119 (e.g., relation extraction code executed by a processor or a specialized circuit designed to implement a relation extractor) and a classification unit 120 (e.g., classification code executed by a processor or a specialized circuit designed to implement a classifier), wherein the relation extraction unit 119 determines the context and relation between the classified tokens and the classification unit 120 determines the type of conversation based on the data provided at the output of the relation extraction unit 119.

Figure 4:
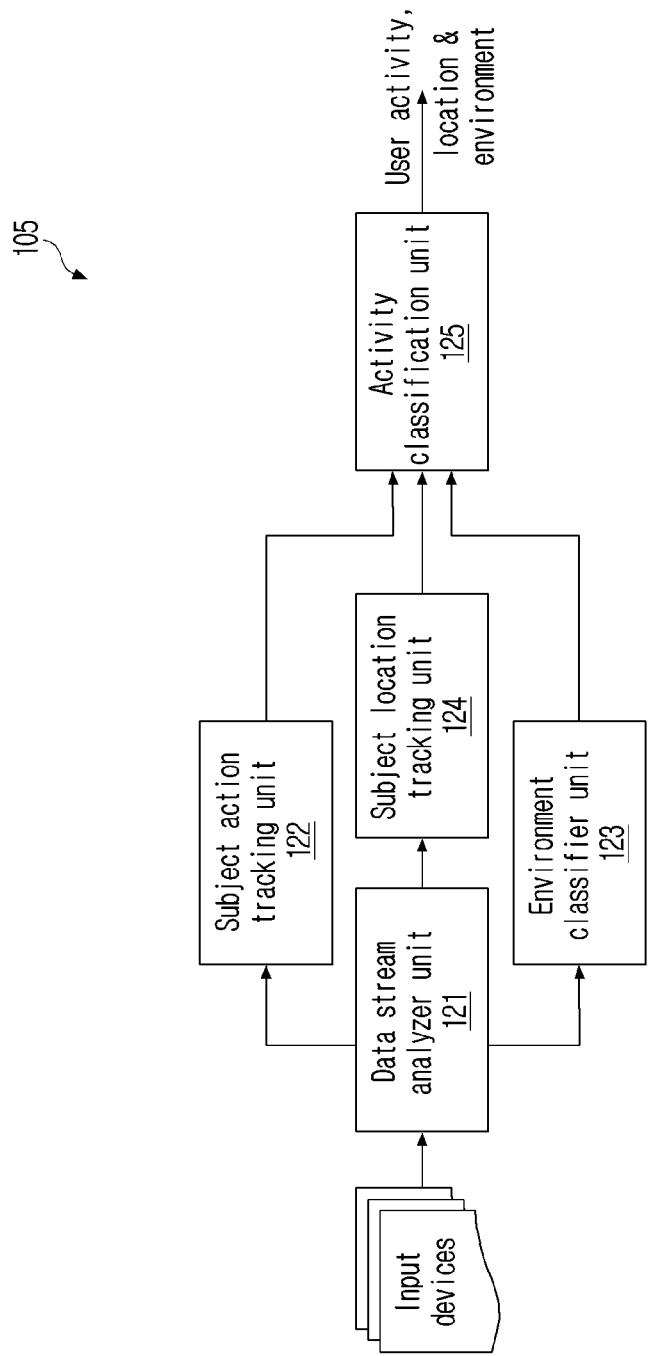
FIG. 4 illustrates a block diagram representation of the activity identification module.

FIG. 4 illustrates a block diagram representation of the activity identification module for tracking the user's activity and identifying the user's environment in real-time, wherein the activity identification module 105 comprises a data stream analyzer unit 121 (e.g., data stream analysis code executed by a processor or a specialized circuit designed to implement a data stream analyzer) for organizing the unorganized raw data such as audio, video, sensor data and so on, received from a plurality of input devices connected in a pre-defined vicinity (e.g., connected to the processor). Further, a subject action tracking unit 122 (e.g., subject action tracking code executed by a processor or a specialized circuit designed to implement a subject action tracker) in the activity identification module 105 is provided for extracting information pertaining to the primary subject present in the organized data received from the data stream analyzer unit 121 and determining the intended action of the identified subject. In one embodiment, the information pertaining to the primary subject present in the organized data may be extracted using a Convolutional Neural Network (CNN).

Further, the activity identification module 105 comprises an environment classifier unit 123 (e.g., environment classifier code executed by a processor or a specialized circuit designed to implement an environment classifier) for determining the environment of the vicinity in which the user is present based on the organized data received from the data stream analyzer unit 121. In one embodiment, the environment classifier unit 123 may identify the environment of the user's vicinity using K-means clustering. Furthermore, the activity identification module 105 comprises a subject location tracking unit 124 (e.g., subject location tracking code executed by a processor or a specialized circuit designed to implement a subject location tracker) for receiving data pertaining to the user's environment from the environment classifier unit 123 and determining the location of the user. In one embodiment, the location of the user may be determined using a triangulation technique considering all the peripheral devices such as microphone, camera, Global Positioning System (GPS) and so on, present in the user's vicinity.

Further, the activity identification module 105 comprises an activity classification unit 125 (e.g., activity classification code executed by a processor or a specialized circuit designed to implement an activity classifier) for classifying the user activity data into activity type, activity state and real-time environment based on the inputs received from the subject tracking unit 122, environment classifier unit 123 and subject location tracking unit 124. In one embodiment, the activity classification unit 125 may employ K-Nearest Neighbors (K-NN) algorithm to classify the user activity data. In one example, if the inputs to the activity classification unit 125 are Driving, Outside, Turns, Speed breakers and GPS location, the activity classification unit 125 classifies the inputs as follows: Activity Type: Movement; Activity State: Ongoing; Environment: Outside, Turns, Speed breakers.

Figure 5:
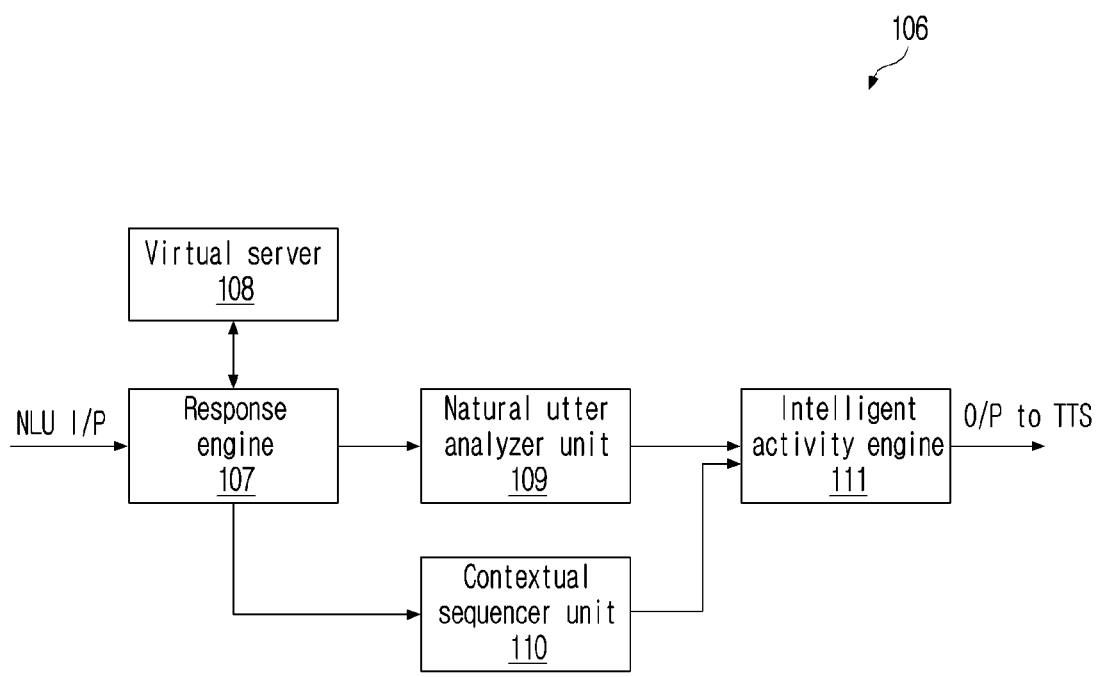
FIG. 5 illustrates a block diagram representation of the processing module.

FIG. 5 illustrates a block diagram representation of the processing module for analyzing and processing the inputs from the natural language understanding module 103 and activity identification module 105, wherein the processing module 106 comprises a response engine 107 for fetching contextual responses to the questions and requests provided by the user based on user intent and entity, from a virtual server 108. Additionally, the processing module 106 comprises a natural utterance analyzer unit 109, a contextual sequencer unit 110 and an intelligent activity engine 111, wherein the natural utterance analyzer unit 109 calculates the contextual natural utterance intervals during real-time conversations between the user and voice assistant. Further, the contextual sequencer unit 110 prioritizes and sequences the responses to the static and dynamic inputs provided by the user, wherein the contextual responses are fetched from the virtual server 108. Furthermore, the intelligent activity engine 111 identifies the user's active listening state and performs the subsequent tasks based on the identified listening state of the user. Resultantly, the contextual text-based responses determined by the processing module 106 are converted into speech format by a text to speech converting module 112.

Figure 6:
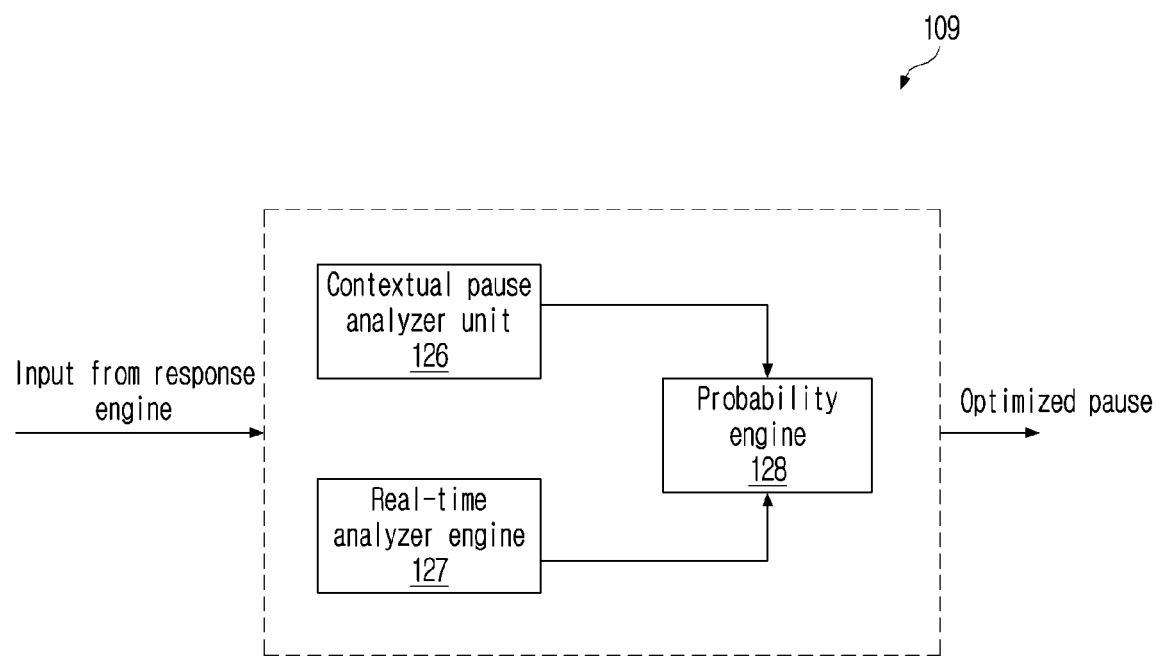
FIG. 6 illustrates a block diagram representation of the natural utterance analyzer unit.

FIG. 6 illustrates a block diagram representation of the natural utterance analyzer unit, wherein the natural utter analyzer unit 109 comprises a contextual pause analyzer unit 126 (e.g., contextual pause analyzer code executed by a processor or a specialized circuit designed to implement a contextual pause analyzer) for accepting inputs from the natural language understanding module 103, activity identification module 105 and response engine 107 and training the received data for further analysis using artificial intelligence and machine learning techniques for introducing contextual pauses based on the time required to complete a particular task requested by a user. In one embodiment, training the received data may include the steps of token embedding, sentence embedding and transformer positional embedding. Further a modified BERT variant may be employed for introducing contextual pauses based on the time required to complete a particular task requested by a user.

In one example, consider the following inputs from the natural language understanding module 103: Intent: Cooking; Entity: Noodles; Communication Type: Instructive. Additionally, consider the following inputs from the response engine 107: Step 1: Boil water for 5 minutes; Step 2: Add Noodles into boiling water; Step 3: Let it cook for 2 minutes; Step 4: Add the spices and stir; Step 5: Serve the noodles. The contextual pause analyzer unit 126 processes the inputs received from the natural language understanding module 103 and response engine 107 and provides the following output: Step 1: 5 minutes pause; Step 2: 0 minutes pause; Step 3: 2 minutes pause; Step 4: 1 minute pause; Step 5: 0 minutes pause.

Further, the natural utter analyzer unit 109 comprises a real-time analyzer engine 127 (e.g., real-time analysis code executed by a processor or a specialized circuit designed to implement a real-time analyzer) for accepting inputs from the activity identification module 105 and calculating a contextual time delay required for completing a real-time interference during an ongoing conversation between the user and voice assistant. In one embodiment, the contextual time delay may be calculated by the real-time analyzer engine 127 using a CNN. In one example, consider the inputs to the real-time analyzer engine 127 from the activity identification module 105 as follows: Activity Type: Conversation; Activity State: Ongoing; Environment: Living Room, News Sound. Further, consider that the activity identification module 105 also captures the following sound: ringtone sound/talking on phone/discussion. The real-time analyzer engine 127 processes the inputs from the activity identification module 105 and determines the output as the user got a call in between and accordingly introduces an intelligent pause as per real time analysis.

Further, the natural utter analyzer unit 109 comprises a probability engine 128 (e.g., probability calculation code executed by a processor or a specialized circuit designed to implement a probability engine) for accepting inputs from the contextual pause analyzer unit 126 and real-time analyzer engine 127 and determining the probability of occurrence of a time delay for a pre-defined event, considering the probability of the occurrence of a similar event which has already occurred, wherein the estimated time delay calculated for a pre-defined event by the probability engine 128 is based on the user's lifestyle, habits, and data pertaining to the user's whereabouts. In one embodiment, the probability of occurrence of a time delay for a pre-defined event may be estimated using Bayes Theorem.

Figure 7:
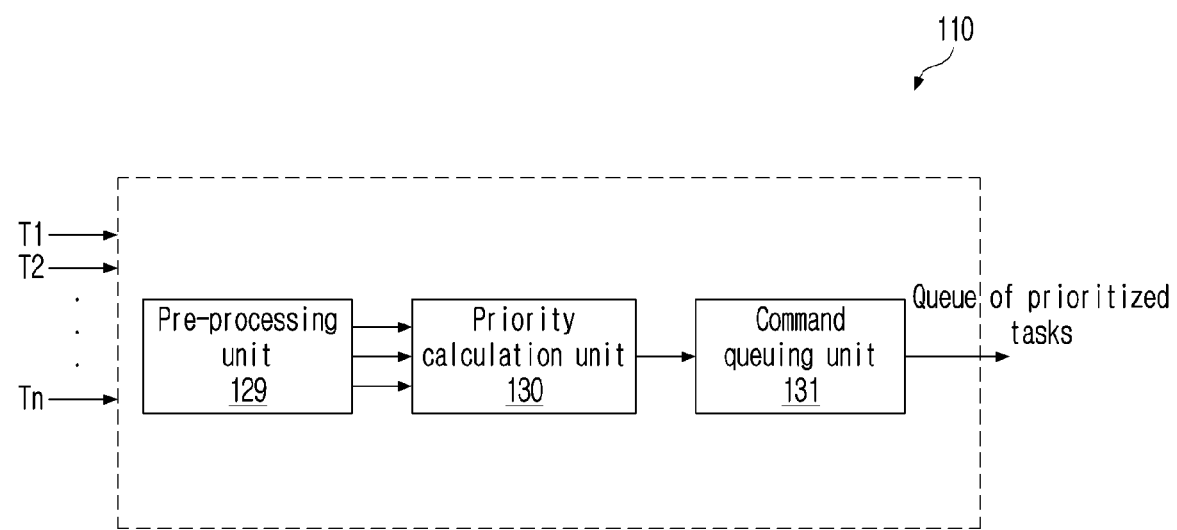
FIG. 7 illustrates a block diagram representation of the contextual sequencer unit.

FIG. 7 illustrates a block diagram representation of the contextual sequencer unit, wherein the contextual sequencer unit 110 determines if the contextual state of the user inputs is static or dynamic by calculating the similarities between the user input and the appropriate response obtained from the response engine 107. In one embodiment, the similarities between the user input and the appropriate response obtained from the response engine 107 may be calculated using an N×N correlation matrix. The contextual sequencer unit 110 comprises a pre-processing unit 129 (e.g., pre-processing code executed by a processor or a specialized circuit designed to carry out pre-processing), priority calculation unit 130 (e.g., priority calculation code executed by a processor or a specialized circuit designed to implement a priority calculator) and command queuing unit 131 (e.g., command queuing code executed by a processor or a specialized circuit designed to implement a command queue), wherein a plurality of tasks obtained from the response engine 107 are assigned to the contextual sequencer unit 110 in parallel and the subsequent stages of weight calculation and prioritization performed by the pre-processing unit 129 and priority calculation unit 130 respectively, are performed simultaneously.

The pre-processing unit 129 is employed for calculating the weight of a plurality of tasks which are obtained from the response engine 107, wherein the weight of each task is estimated based on static/dynamic context, waiting time and response length. Upon calculating the weight of a plurality of tasks, the priority of each task is determined by the priority calculation unit 130 based on the weight calculated for the corresponding task by the pre-processing unit 129. Subsequently, the command queuing unit 131 is provided for sequencing the tasks and the related time delays for the tasks based on the priority estimated by the priority calculation unit 130.

Figure 8:
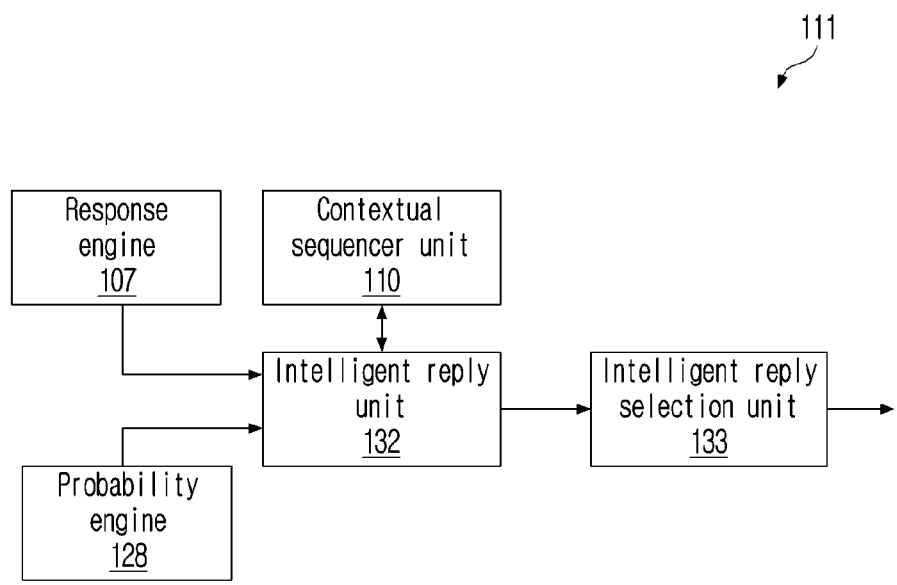
FIG. 8 illustrates a block diagram representation of the intelligent activity engine.

FIG. 8 illustrates a block diagram representation of the intelligent activity engine, wherein the intelligent activity engine 111 comprises an intelligent reply unit 132 (e.g., intelligent reply code executed by a processor or a specialized circuit designed to implement an intelligent reply system) which accepts inputs from the response engine 107, contextual sequencer unit 110 and probability engine 128 for providing one or more real-time intuitive mingling responses based on the responses, contextual pauses, and ongoing activity. Further, the intelligent activity engine 111 comprises an intelligent reply selection unit 133 (e.g., intelligent reply selection code executed by a processor or a specialized circuit designed to implement an intelligent reply selector) such as, but not limited to Long Short-Term Memory LS™ for selecting the most appropriate and intelligent response from the multiple responses provided by the intelligent reply unit 132, wherein the response selected by the intelligent reply selection unit 133 present in the intelligent activity engine 111 is provided to the text to speech converting module 112 through an executor which concatenates the intelligent response along with the calculated contextual pause.

Figure 9:
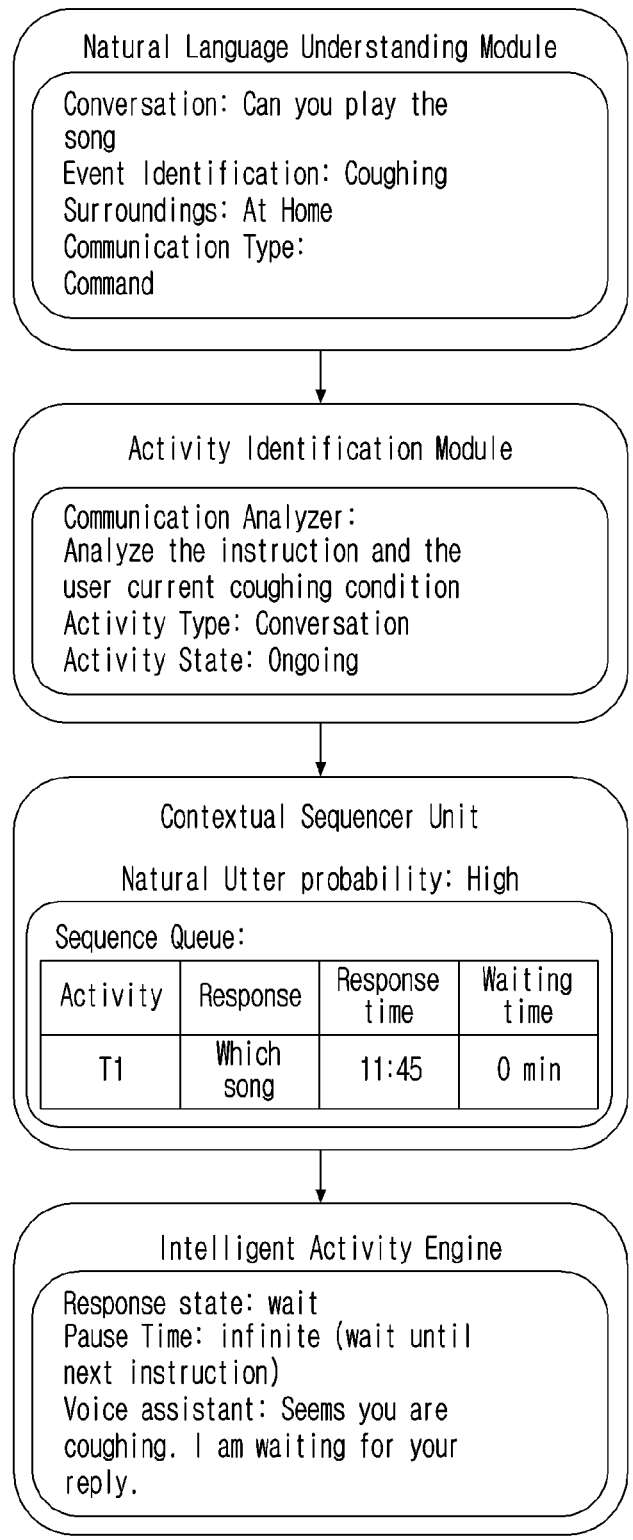
FIG. 9 illustrates a flow diagram of the first use case of the present disclosure.

FIG. 9 illustrates a flow diagram of a first exemplary use case of the present disclosure pertaining to unintended natural pause during a conversation between the user and voice assistant. Consider the following user input, "Can you play the song", wherein the user coughs before completing the question. The natural language understanding module 103 provided in the system 100, identifies the event, i.e., coughing and the user's surroundings, i.e., home. The user's biological state includes and is not limited to coughing, hiccups, sneezing, yawning and so on. Further, the communication classification unit 104 classifies the user's input as a command. Subsequently, the activity identification module 105 analyzes the user's input and acknowledges the user's biological state, i.e., coughing. Further, the activity identification module 105 identifies the activity type as a conversation and activity state as "ongoing". Further, based on the inputs from the natural language understanding module 103 and activity identification module 105, the contextual sequencer unit 110 in the processing module 106 determines that the natural utter probability is high and subsequently, sequences the tasks and the related time delays for the tasks based on the estimated priority, i.e., high. In the first use case, since there is a singular task, the contextual sequencer unit 110 provides the following response to the user, "which song?" and logs the time at which the response was provided to the user. Further, the voice assistant immediately responds to the user's inputs due to which the waiting time is recorded as zero. Based on the prioritization and sequencing of tasks calculated by the contextual sequencer unit 110, the intelligent activity engine 111 determines the response state, i.e., to wait since the user is coughing. Further, the pause time is infinite as the user is coughing and the subsequent input is received only after the user coughs. Hence, based on the above-mentioned estimations, the voice assistant responds, "seems you are coughing. I am waiting for your reply". Therefore, it is apparent that the system 100 and method 200 overcomes the challenges of the prior art by providing real-time intuitive mingling responses based on the responses, contextual pauses and ongoing activity of the user.

Figure 10:
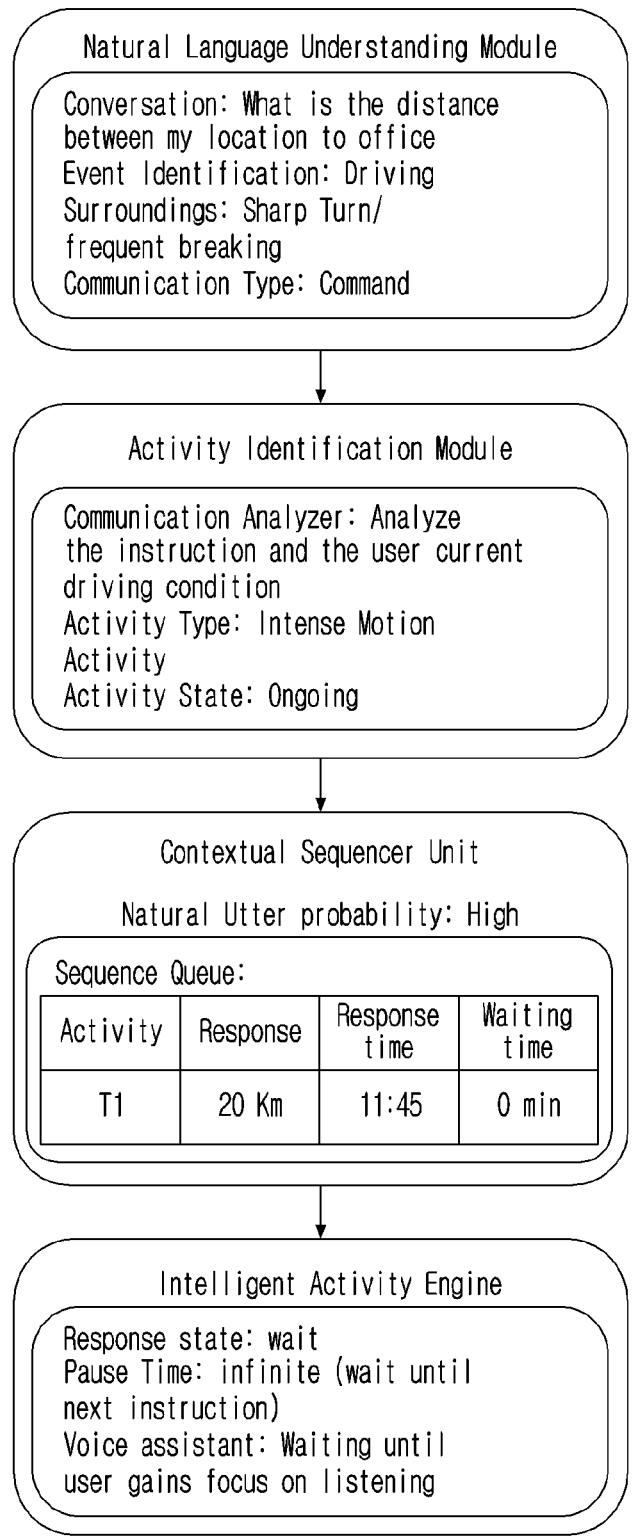
FIG. 10 illustrates a flow diagram of the second use case of the present disclosure.

FIG. 10 illustrates a flow diagram of a second exemplary use case of the present disclosure pertaining to user movement during a conversation between the user and voice assistant. Consider the following user input, "What is the distance between my location to office", wherein the user is driving while asking the question. The natural language understanding module 103 provided in the system 100, identifies the event, i.e., driving and the user's surroundings, which is identified by sharp turns or frequent braking of the user's vehicle. The motion-based events include but are not limited to running, driving, using the staircase, lift and so on. Further, the communication classification unit 104 classifies the user's input as a command. Subsequently, the activity identification module 105 analyzes the user's input and acknowledges the user's current driving condition. Further, the activity identification module 105 identifies the activity type as an intense motion activity and activity state as "ongoing". Further, based on the inputs from the natural language understanding module 103 and activity identification module 105, the contextual sequencer unit 110 in the processing module 106 determines that the natural utter probability is high and subsequently, sequences the tasks and the related time delays for the tasks based on the estimated priority, i.e., high. In the present use case, since there is a singular task, the contextual sequencer unit 110 provides the following response to the user, "Distance between your current location to office is 20 Km" and logs the time at which the response was provided to the user. Further, the voice assistant immediately responds to the user's inputs due to which the waiting time is recorded as zero. Based on the prioritization and sequencing of tasks calculated by the contextual sequencer unit 110, the intelligent activity engine 111 determines the response state, i.e., to wait until the user gains focus on listening. Hence, based on the above-mentioned estimations, the voice assistant waits until the user gains focus on listening instead of providing the response while the user is unable to hear the voice assistant thereby making it counter-productive. Therefore, it is apparent that the system 100 and method 200 overcomes the challenges of current systems by providing real-time intuitive mingling responses based on the responses, contextual pauses and ongoing activity of the user.

Figure 11:
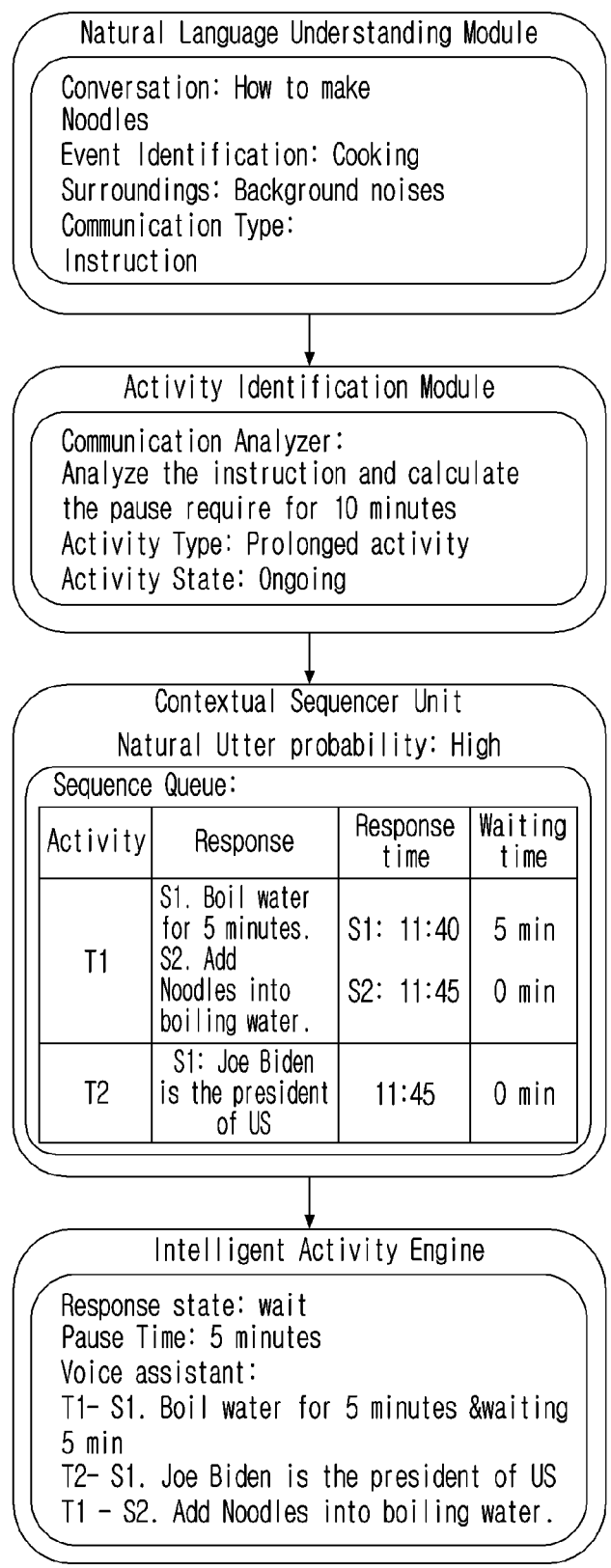
FIG. 11 illustrates a flow diagram of the third use case of the present disclosure.

FIG. 11 illustrates a flow diagram of a third exemplary use case of the present disclosure pertaining to the ability of the voice assistant to maintain the context of the conversation between the user and voice assistant during prolonged activities such as exercise, cooking, and so on which is interrupted by an out-of-context input. Consider the following user input, "How to make Noodles", wherein the natural language understanding module 103 provided in the system 100, identifies the event, i.e., cooking and the user's surroundings, which is identified by background noises. Further, the communication classification unit 104 classifies the user's input as an instruction. Subsequently, the activity identification module 105 analyzes the user's input and acknowledges the user's current condition. Further, the activity identification module 105 analyzes the instruction and calculates the pause require for 10 minutes. Further, the activity identification module 105 identifies the activity type as a prolonged activity and activity state as "ongoing". Further, based on the inputs from the natural language understanding module 103 and activity identification module 105, the contextual sequencer unit 110 in the processing module 106 determines that the natural utter probability is high and subsequently, sequences the tasks and the related time delays for the tasks based on the estimated priority, i.e., high. In the third use case, since there are two tasks, the contextual sequencer unit 110 provides the following response to the user, "Boil water for 5 minutes" and logs the time at which the response was provided to the user. Further, the voice assistant notes that the waiting time is five minutes after which the second response, i.e., "add noodles into boiling water" is provided. Consider an out-of-context question by the user amidst the prolonged activity of cooking, i.e., "Who is the president of USA?", wherein there is no waiting time associated with the question. Based on the prioritization and sequencing of tasks calculated by the contextual sequencer unit 110, the intelligent activity engine 111 determines the response state, i.e., to wait for 5 minutes between the task of boiling water for 5 minutes and adding noodles into boiling water. Hence, based on the above-mentioned estimations, the voice assistant waits for 5 minutes after the first instruction of boiling water for 5 minutes. Since the voice assistant does not have to provide the next step before the completion of 5 minutes, the voice assistant responds to the out-of-context question that "Joe Biden is the president of the USA". Upon the completion of 5 minutes, the second instruction pertaining to adding noodles to the boiling water is provided. Therefore, it is apparent that the system 100 and method 200 overcomes the challenges of current systems by providing real-time intuitive mingling responses based on the responses, contextual pauses and ongoing activity of the user.

Figure 12:
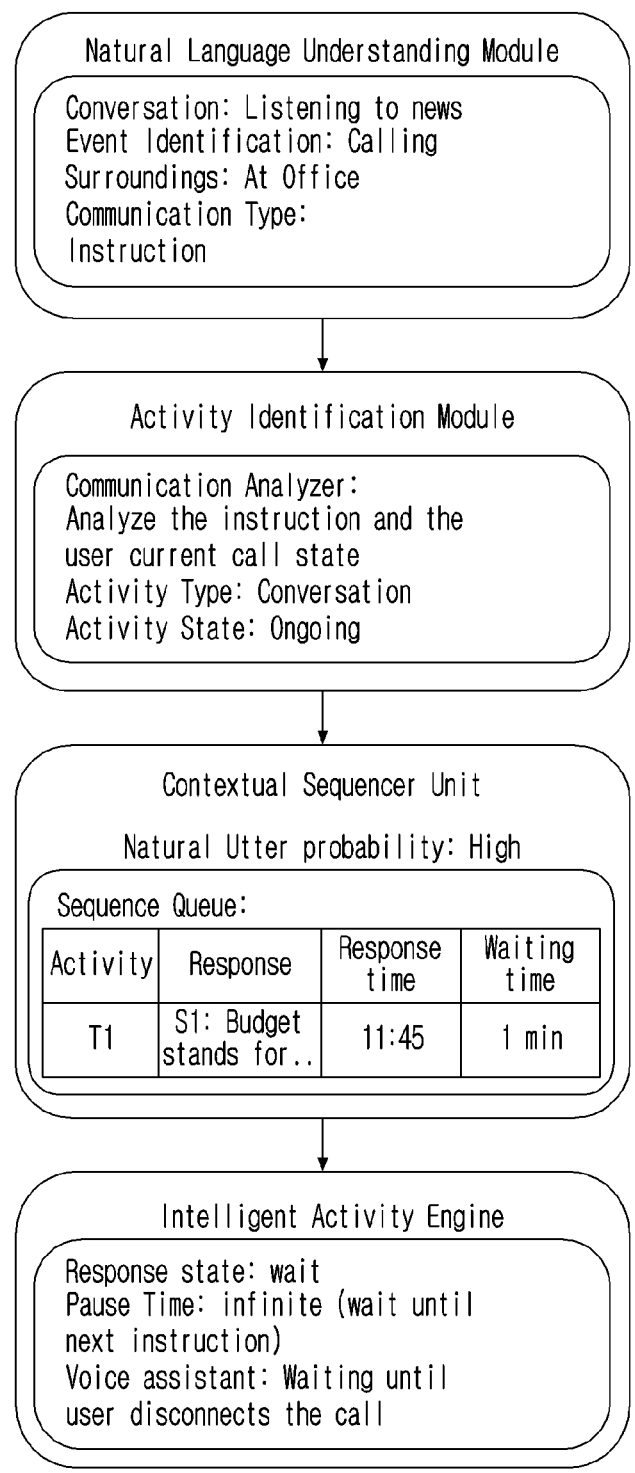
FIG. 12 illustrates a flow diagram of the fourth use case of the present disclosure.

FIG. 12 illustrates a flow diagram of a fourth exemplary use case of the present disclosure pertaining to secondary activity distractions during a conversation between the user and voice assistant. Consider a case where the voice assistant is playing the news for the user and the user is listening to the same. Further, consider that the user gets interrupted by a call. The natural language understanding module 103 provided in the system 100, identifies the event, i.e., calling and the user's surroundings, i.e., office. Further, the communication classification unit 104 classifies the user's input as an instruction. Subsequently, the activity identification module 105 analyzes the instruction and the user's current call state. Further, the activity identification module 105 identifies the activity type as a conversation and activity state as "ongoing". Further, based on the inputs from the natural language understanding module 103 and activity identification module 105, the contextual sequencer unit 110 in the processing module 106 determines that the natural utter probability is high and subsequently, sequences the tasks and the related time delays for the tasks based on the estimated priority, i.e., high. In the present use case, since there is a singular task, the contextual sequencer unit 110 provides the following response to the user, "Budget stands for continuity, stability, predictability in taxation, says FM Nirmala Sitharaman" and logs the time at which the response was provided to the user. Based on the prioritization and sequencing of tasks calculated by the contextual sequencer unit 110, the intelligent activity engine 111 determines the response state, i.e., to wait until the user disconnects the call. Hence, based on the above-mentioned estimations, the voice assistant waits until the user disconnects the call instead of providing the response while the user is attending to the call. Therefore, it is apparent that the system 100 and method 200 overcomes the challenges of current systems by providing real-time intuitive mingling responses based on the responses, contextual pauses and ongoing activity of the user.

The present disclosure provides a system 100 and method 200 for making the existing voice assistants more intelligent and capable of conversing with a user continuously and naturally therefore overcoming the robotic and monotonous responses provided by the existing voice assistants. The processing module 106 provided in the system calculates contextual pauses and provides one or more real-time intuitive mingling responses based on the responses, contextual pauses and ongoing activity of the user.

At least one of the plurality of modules described herein may be implemented through an AI model. A function associated with AI may be performed through the non-volatile memory, the volatile memory, and the processor. The processor may include one or a plurality of processors. At this time, one or a plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or artificial intelligence AI model stored in the non-volatile memory and the volatile memory. The predefined operating rule or artificial intelligence model is provided through training or learning. Here, being provided through learning means that, by applying a learning algorithm to a plurality of learning data, a predefined operating rule or AI model of a desired characteristic is made. The learning may be performed in a device itself in which AI according to an embodiment is performed, and/o may be implemented through a separate server/system.

The AI model may consist of a plurality of neural network layers. Each layer has a plurality of weight values and performs a layer operation through calculation of a previous layer and an operation of a plurality of weights. Examples of neural networks include, but are not limited to, convolutional neural network CNN, deep neural network DNN, recurrent neural network RNN, restricted Boltzmann Machine RBM, deep belief network DBN, bidirectional recurrent deep neural network BRDNN, generative adversarial networks GAN, and deep Q-networks. The learning algorithm is a method for training a predetermined target device for example, a robot using a plurality of learning data to cause, allow, or control the target device to make a determination or prediction. Examples of learning algorithms include, but are not limited to, supervised learning, unsupervised learning, semi-supervised learning, or reinforcement learning.

The device-readable storage medium may be provided in the form of a non-transitory storage medium. Here, 'non-temporary storage medium' only means that it is a tangible device and does not contain signals (e.g., electromagnetic waves). This term does not distinguish between a case in which data is stored semi-permanently in a storage medium and a case in which data is stored temporarily. For example, a 'non-temporary storage medium' may include a buffer in which data is temporarily stored.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smartphones) directly. If distributed online, at least part of the computer program product (e.g., a downloadable app) may be temporarily generated or at least temporarily stored in the machine-readable storage medium, such as memory of the manufacturer's server, a server of the application store, or a relay server.

While at least one exemplary embodiment has been presented in the foregoing detailed description, it should be appreciated that a vast number of variations exist.

What is claimed is:

1. A method of providing natural utterance by a voice assistant, the method comprising:
   receiving, through a microphone, at least one unsegmented voice input from a user;
   converting the at least one unsegmented voice input into a textual format;
   extracting user information from the textual format;
   classifying the extracted user information into one or more pre-defined classes;
   subsequent to the classifying the extracted user data, tracking activity of the user and identifying an environment of the user based on data received through one or more sensors including the microphone;
   calculating at least one contextual natural utterance interval during conversations between the user and the voice assistant;
   prioritizing and sequencing at least one contextual response to the at least one unsegmented voice input, wherein the at least one contextual response is fetched from a virtual server; and
   providing one or more responses based on the at least one contextual natural utterance interval and ongoing environmental activity detected in the identified environment of the user.

2. The method of claim 1, further comprising:
detecting an utterance of a wake word,
wherein the at least one unsegmented voice input received from the user is received after detection of the wake word.

3. The method of claim 1,
wherein the one or more pre-defined classes comprise a request and a command, and
wherein the request and the command pre-defined classes each comprise a momentary communication containing at least one prompt response from the voice assistant.

4. The method of claim 1,
wherein the one or more pre-defined classes comprise an instruction comprising a prolonged communication between the user and the voice assistant and further comprising a plurality of contextual responses.

5. The method of claim 1, further comprising:
subsequent to the prioritizing and sequencing of the at least one contextual response to the at least one unsegmented voice input received from the user, identifying an active listening state of the user and performing at least one task based on the identified active listening state of the user and the at least one contextual natural utterance interval.

6. The method of claim 1, wherein the providing one or more responses further comprises: using machine pre-trained deep neural network.

7. A system for providing natural utterances by a voice assistant, the system comprising:
a microphone;
at least one memory storing at least one instruction;
at least one processor in communication with the at least one memory and configured to execute the at least one instruction to:
receive, through the microphone, at least one unsegmented voice input from a user,
identify an utterance of a wake word received through the microphone,
based on identifying the utterance of the wake word, convert the at least one unsegmented voice input into a textual format,
extract user information from the textual format,
classify the extracted user information into one or more pre-defined classes,
subsequent to classifying the extracted user data, tracking activity of the user and identifying an environment of the user based on data received through one or more sensors including the microphone,
calculate at least one contextual natural utterance interval during conversations between the user and the voice assistant,
prioritize and sequence at least one contextual response to the at least one unsegmented voice input, wherein the at least one contextual response is fetched from a virtual server, and
identify an active listening state of the user and perform at least one task based on the identified active listening state of the user.

8. The system of claim 7,
wherein the one or more pre-defined classes comprise a request and a command, and
wherein the request pre-defined class and the command pre-defined class each comprise a momentary communication triggering a prompt response from the voice assistant.

9. The system of claim 7, wherein the one or more pre-defined classes comprise an instruction comprising a prolonged communication between the user and the voice assistant and further comprising a plurality of contextual responses.

10. The system of claim 7, wherein the at least one processor is further configured to execute the at least one instruction to:
fetch the at least one contextual response from the virtual server based on the extracted user information.

11. The system of claim 7, wherein the at least one processor is further configured to execute the at least one instruction to:
convert the at least one contextual response from a text format into a speech format.

12. The system of claim 7, wherein the at least one processor is further configured to execute the at least one instruction to:
convert the at least one unsegmented voice input into the textual format by detecting positive, negative and neutral sentiments present in the at least one unsegmented voice input provided by the user, and
extract the user information from the textual format by classifying an intent of the user based on sentiments detected in the at least one unsegmented voice input, and by determining one or more subjects present in the at least one unsegmented voice input.

13. The system of claim 7, wherein the at least one processor is further configured to execute the at least one instruction to classify the extracted user information into one or more pre-defined classes by:
splitting the converted text format of the at least one unsegmented voice input provided by a user into one or more tokens, wherein each token represents a word from the converted text format of the at least one unsegmented voice input provided by a user,
classifying the tokens into one or more pre-defined classes,
determining a context and a relation between the classified tokens, and
determining a type of conversation based on determined context and the determined relation between the classified tokens.

14. The system of claim 7, wherein the at least one processor is further configured to execute the at least one instruction to:
receive and organize unorganized raw data from a plurality of input devices located in a pre-defined vicinity,
extract, from the organized data, information pertaining to the user,
determine an intended action of the user based on the extracted information,
identify the environment of the user based on the organized data,
receive data pertaining to the environment of the user and based on the received data pertaining to the environment of the user, determine the location of the user, and
classify data related to the user into activity type, activity state and environment based on at least one of the extracted information pertaining to the user, the determination of the environment of the user, and the determined location of the user.

15. A non-transitory computer readable medium having instructions stored therein, which when executed by at least one processor cause the at least one processor to execute a method of providing natural utterances by a voice assistant, the method comprising:
receiving, through a microphone, at least one unsegmented voice input from a user;

converting the at least one unsegmented voice input into a textual format;
extracting user information from the textual format;
classifying the extracted user information into one or more pre-defined classes;
subsequent to the classifying the extracted user data, tracking activity of the user and identifying an environment of the user based on data received through one or more sensors including the microphone;
calculating at least one contextual natural utterance interval during conversations between the user and the voice assistant;
prioritizing and sequencing at least one contextual response to the at least one unsegmented voice input, wherein the at least one contextual response is fetched from a virtual server; and
providing one or more responses based on the at least one contextual natural utterance interval and ongoing environmental activity detected in the identified environment of the user.

16. The non-transitory computer readable medium of claim 15, wherein the method further comprises:
  detecting an utterance of a wake word,
  wherein the at least one unsegmented voice input received from the user is received after detection of the wake word.

17. The non-transitory computer readable medium of claim 15,
  wherein the one or more pre-defined classes comprise a request and a command, and
  wherein the request and the command pre-defined classes each comprise a momentary communication containing at least one prompt response from the voice assistant.

18. The non-transitory computer readable medium of claim 15,
  wherein the one or more pre-defined classes comprise an instruction comprising a prolonged communication between the user and the voice assistant and further comprising a plurality of contextual responses.

* * * * *